(12) United States Patent
Holler et al.

(10) Patent No.: US 6,479,175 B1
(45) Date of Patent: Nov. 12, 2002

(54) CERAMIC COMPOSITE

(75) Inventors: Wolfram Holler, Eltville (DE); Rudolf Herrmann Gronebaum, Salzgitter-Bad (DE); Horst Geber, Gau-Algesheim (DE); Steve Lee, Schottland (GB); Erich Galle, Dornburg (DE); Volkan Haneti, Kelsterbach (DE); Daniel Grimm, Bad Schwalbach (DE); Thomas Schmid, Eltville (DE)

(73) Assignee: Didier-Werke AG, Wiesbaden (DE)

( * ) Notice: Subject to any disclaimer, the term of this patent is extended or adjusted under 35 U.S.C. 154(b) by 0 days.

(21) Appl. No.: 09/704,883

(22) Filed: Nov. 2, 2000

(51) Int. Cl.[7] .............................................. B32B 19/00
(52) U.S. Cl. ....................... 428/701; 428/702; 222/566; 222/591; 501/94; 501/96.1
(58) Field of Search .......................... 428/701; 222/591, 222/566; 501/94, 96.1, 99, 102

(56) References Cited

U.S. PATENT DOCUMENTS

| 4,682,718 | A | * | 7/1987 | Watanabe et al. ........... 222/591 |
| 5,147,834 | A | | 9/1992 | Banerjee |
| 5,259,596 | A | * | 11/1993 | Ruffaldi ...................... 266/271 |
| 5,348,202 | A | * | 9/1994 | Lee ............................. 222/606 |
| 5,370,370 | A | | 12/1994 | Benson |
| 5,908,577 | A | * | 6/1999 | Yamamura et al. ......... 222/606 |

FOREIGN PATENT DOCUMENTS

| DE | 3444407 A1 | 6/1986 |
| DE | 3523420 C1 | 1/1987 |
| DE | 4003608 C1 | 6/1991 |
| DE | 19727649 A1 | 1/1999 |
| FR | WO 95/34395 | 12/1995 |
| GB | 2095612 A | 10/1982 |
| JP | XP-002108934 | 5/1987 |

* cited by examiner

Primary Examiner—Deborah Jones
Assistant Examiner—G. A. Blackwell-Rudasill
(74) Attorney, Agent, or Firm—Craig G. Cochenour; Buchanan Ingersoll, P.C.

(57) ABSTRACT

The invention relates to a ceramic composite, in particular for use in secondary metallurgy, consisting of at least a first layer comprised of a carbon-containing, oxide refractory material, and a second layer comprised of a carbonless oxide refractory material bound with a binding agent.

16 Claims, No Drawings

CERAMIC COMPOSITE

BACKGROUND OF THE INVENTION

1. Field of the Invention

The invention relates to a ceramic composite, in particular for use in secondary metallurgy.

2. Description of the Background Art

There are numerous known refractory ceramic components, which are used in secondary metallurgy and serve, for example, to receive or route through metallurgical melts. These include nozzle sleeves, submerged nozzles, monoblock stoppers, distribution sleeves and the like.

A high erosion and corrosion resistance, good temperature change resistance and high service life are required of these refractory products.

Depending on the application, various ceramic materials are used. For example, submerged rods of the mentioned kind today normally consist of $Al_2O_3$ graphite materials.

In this correlation, it is known that, when casting specific sorts of steel, e.g., so-called ULC (ultra-low carbon) steels, carbon is absorbed from the refractory material by the fluid steel, and aluminum oxide is built up in the steel/refractory material contact area. This buildup, also called "clogging", can pose a serious problem, for example for low-carbonized, Al-killed steels. Adhering aluminum oxide on the somewhat cooler refractory material can clog a submerged nozzle to such an extent after a certain time as to interrupt the casting process.

These phenomena have been comprehensively described in the literature (J. Poirier in New Submerged Nozzles to Reduce Alumina Buildup in Continuous Casting, pp. 79–86).

The result is found to be that carbon-free, refractory materials can better prevent the mentioned buildup of aluminum oxide better than conventional refractory materials based on $Al_2O_3$ graphite.

U.S. Pat. No. 5,370,370 describes a refractory molded article, whose one side consists of a carbon-bound, refractory oxide material, and whose other side exhibits a carbonless, oxidized zone infiltrated with a carbonless, refractory material.

For manufacturing purposes, a carbon-containing refractory material is first molded into a submerged nozzle, for example. The outside surface is subsequently glazed. The submerged nozzle is then burned in an oxidizing atmosphere. The carbon is burned out on the unglazed side in the process, which can be limited by setting the burning duration over a specific penetration depth, e.g., 2–3 mm. This "oxidized zone" is then infiltrated with the carbonless refractory material.

The advantage to such a submerged nozzle is that it has one layer comprised of a carbonless material in the contact area to the molten bath (inside) that largely prevents the molten bath from building up. However, the manufacture of such a molded article involves an extremely high outlay, as described.

WO 95/34395 proposes a refractory part for use in steel casting, which contains carbon throughout. To still prevent the cited buildup, it is proposed that the molded article be designed as a composite, specifically with a layer adjacent to the molten bath, which becomes gastight at temperatures exceeding 1000° C. To this end, it is proposed that the corresponding sintering aids be added to this layer, namely in the form of fine particles (<50 μm).

At 4–9% w/w, the carbon content of this layer is distinctly lower than the carbon content of the adjacent layer (put at 20–30% w/w). However, this feature in itself does not reduce the danger of a buildup, which makes the other feature of sintering the corresponding layer gastight during operation highly significant. This simultaneously results in a considerable operational unreliability, since the sealed layer is only to be formed during the casting process.

DE 35 23 420 C1 describes a method, in which a slip is casted into a hollow mould formed by a basic body. When the slip is in contact with the porous sucking basic body, a layer is formed on its surface by the hollow casting method.

The refractory composite according to DE 197 27 649 A1 shows two commonly compression moulded layers.

SUMMARY OF THE INVENTION

In this respect, the object of the invention is to provide a ceramic component that is able to prevent the mentioned buildup as reliably as possible, can be manufactured in a simple procedure, and exhibits the best possible resistance to erosion, corrosion and temperature change.

It was recognized that carbon-containing and carbonless (carbon free) refractory ceramic materials can be processed into a ceramic composite that remains crack-free even during exposure to temperature loads and changes in a single manufacturing process if the C-containing first layer is compression molded, and the carbonless second layer is applied to the compression molded (pressed) layer as a monolithic layer.

DETAILED DESCRIPTION OF THE INVENTION

In this respect, the invention in its most general embodiment relates to a ceramic composite comprised of at least:

a first layer with a carbon-containing, oxide refractory material, and a second layer with a carbonless oxide refractory material bonded by a binding agent, wherein the carbon-containing layer is compression molded and the carbonless layer is applied to the prefabricated first layer as a monolithic mass. The compression-molded part can also already be pre-burned, before it is combined with the monolithic layer.

The oxide refractory materials of the layers form the primary constituent of the layers. Their share generally measures at least >50% w/w of the total mass of each layer, respectively. The additional constituents consist, for example, of various refractory nitrides, binding agents or other additives, as well as carbon for the first layer.

As an example of submerged nozzle manufacture, the ceramic composite can be fabricated as follows:

In an isostatic press, a carbon-containing, refractory material with oxide matrix material as the primary component (first layer) is press molded between a central steel mandrel and an outside rubber sleeve. The molding is removed and placed on the mandrel, accompanied by the formation of an annular gap between the mandrel and first molding. Subsequently, the annular gap is cast with the mass for the second, carbonless layer, and the mandrel is removed after a green bond has been achieved.

The composite can then be hardened (at approx. 150–250° C.), tempered (at 250–600° C.) and/or burned (>600° C.) Such a refractory ceramic composite was tested in an induction oven using ST 37 steel, wherein 1.5% w/w of aluminum metal were added twice to simulate a so-called "clogging test".

No buildup of aluminum oxide could be detected in the area of the carbonless second layer. Crack formation did not take place between and in the layers.

As an alternative, the interior space of the first molding of the composite can also be completely cast or lubricated with the carbonless mass, and then rebored to the desired wall thickness or otherwise sliced mechanical.

The material for the first layer can basically consist of all materials from which carbon-containing products can be manufactured, e.g., $Al_2O_3$, $ZrO_2$, $SiO_2$ and MgO individually or in combination, wherein the carbon share normally measures between 10 and 40% w/w as graphite, relative to the total mass of the first layer.

The most varied of conventional refractory materials can also be used as the refractory material for the second layer, primarily based on $ZrO_2$, mullite, zirconium mullite, calcined alumina, corundum, nitrides like silicon nitride, individually or in combination.

To achieve a sufficient green bond for the second, carbonless layer, it is necessary to stabilize the refractory particles with the help of a binding agent until a ceramic bond has formed. Established suitable binders include phosphate-containing materials like phosphoric acid or monoaluminum phosphate, clay slip, glycol, sulfite liquor, refractory cement, soluble potassium, $SiO_2$ gel, $SiO_2$ sol or synthetic resin, individually or in mixture.

Any plastic used as the binding agent would contain carbon; however, the synthetic resin binding agent will be used in very small quantities (0.5 to max. 2% w/w relative to the total mass of the second layer), and the carbon cracks during subsequent tempering, so that no negative influences of the plastic initially containing carbon in terms of buildup prevention could be determined. In addition, any slight carbon residues would burn off while preheating the composite. However, a carbon content introduced into the batch via the binding agent for the second layer would have to be limited to <2% w/w, in any event.

According to the invention, the second layer, which contains no share of elementary carbon additive (e.g., graphite, carbon black, coke), and only exhibits a carbon content of at most 2% w/w introduced with the binding agent, is referred to as carbonless.

Typical shares of the mentioned binding agent (in % w/w, relative to the total mass of the second layer) are;

for the phosphate-containing material: 3–7 for the clay slip: 10–17 for glycol: 5–10 for sulfite liquor: 5–10 for $SiO_2$ sol or $SiO_2$ gel: 3–7 for soluble potassium: 1–5 for synthetic resin: 0.5–2 for refractory cement, e.g., calcium aluminate cement: 1–10.

As the refractory material, a typical batch for the second layer contains 50–60% w/w of $Al_2O_3$, 20–30% w/w of $SiO_2$, 15–25% w/w of $ZrO_2$ as well as up to 9% w/w of CaO, $P_2O_5$, $Na_2O$ and $K_2O$, individually or in combination.

The chip-proofness of the composite can be increased and the danger of crack formation avoided by selecting the materials for the layers in such a way that the carbon-containing layer exhibits a lower heat expansion coefficient than the carbonless layer. In this way, a carbonless inside layer presses against a carbon-containing, per se "more flexible" outside layer.

The expansion coefficients can here vary by up to 0.2 percentage points (absolute). The chipping danger is controlled primarily by the specific adjustment of the respective layer thicknesses. To this end, it is proposed that the ratio of wall thicknesses for the first layer to the second layer be set at $\geq 1.5:1$, according to one embodiment at >2:1.

During a preferred inductive heating of the composite, the carbon-containing outside layer initially expands. As the result of heat conduction, the carbonless inside layer gets warmed by the outside layer, and then expands into the expanded outside layer. During the entire time the composite is in use, the outside layer can here be kept at the temperature of an accompanying melt or at a higher temperature at which the outside layer exhibits an expansibility, ductility or structural flexibility. This allows the heated outside layer to be plastically deformed by the expanding inside layer. In this way, crack formation in the outside layer can be avoided. The expansion coefficients can vary by up to about 0.5 percentage points (absolute) in this heating procedure. When adjusting the respective layer thicknesses, the thickness ratio between the first and second layer can be reduced as a function of the difference in expansion coefficients.

As described, the mentioned composites can be used in particular in the area of secondary metallurgy and to cast aggressive steels. Hence, they can be fabricated as a submerged nozzle, for example in which the first carbon-containing layer is outside and the second carbonless layer is inside.

Another mode of fabrication yields a monoblock stopper or a monoblock stopper cap, in which the first layer runs inside and the second layer outside.

The composite can also be fabricated as a distribution sleeve or shadow pipe, in which the first layer again is outside, and the second inside.

The composite exhibits favorable resistance to erosion and corrosion, and hence also permits applications in horizontal extrusion, and as a tapping sleeve of a melting vessel.

We claim:

1. A ceramic refractory composite body comprising at least a first layer with a carbon-containing, oxidic refractory material, and a second layer applied to the first layer of a carbon-free oxidic material bonded by a binding agent, wherein the carbon-containing first layer comprises a molded workpiece and the carbon-free second layer comprises a monolithic casted mass or lubricating mass wherein said carbon-free second layer is applied to said molded workpiece of said first layer directly by casting.

2. A composite according to claim 1, in which the first, carbon-containing layer is isostatically press molded.

3. A composite according to claim 1, in which the ratio of wall thicknesses between the first and second layer equals $\geq 1.5:1$.

4. A composite according to claim 1, in which the second, carbonless layer consists of a material whose heat expansion coefficient exceeds that of the first, carbon-containing layer.

5. A composite according to claim 1, in which the first layer contains $\geq 50\%$ w/w of $Al_2O_3$, $ZrO_2$, $SiO_2$ and MgO individually or in combination, along with 10 to 40% w/w of carbon, in particular in the form of graphite, in addition to up to 25% w/w of nonoxide refractory components.

6. A composite according to claim 1, in which the binding agent of the second layer consists of a phosphate-containing material like phosphoric acid or monoaluminum phosphate, a clay slip, glycol, sulfite liquor, refractory cement, soluble potassium, $SiO_2$ gel, $SiO_2$ sol or synthetic resin, individually or in mixture.

7. A composite according to claim 6, with the following shares (in % w/w) of the binding agent, each relative to the total mass for the second layer:

the phosphate-containing material: 3–7
the clay slip: 10–17
glycol: 5–10
sulfite liquor: 5–10
$SiO_2$ sol or $SiO_2$ gel: 3–7
soluble potassium: 1–5
synthetic resin: 0.5–2
refractory cement: 1–10.

8. A composite according to claim 1, in which the refractory material of the second layer consists primarily of $ZrO_2$, mullite, zirconium mullite, calcined alumina, corundum or nitrides, individually or in combination.

9. A composite according to claim 1, in which the refractory material of the second layer contains 50–60% w/w of $Al_2O_3$, 20–30% w/w of $SiO_2$, 15–25% w/w of $ZrO_2$ as well as up to 9% w/w of CaO, $P_2O_5$, $Na_2O$ and $K_2O$, individually or in combination.

10. A composite according to claim 1, in which the refractory material of the second layer contains up to 5% w/w of boron nitride and silicon nitride, individually or in combination.

11. A composite according to claim 1, in which the first, carbon-containing layer consists of a material that exhibits plastic deformation at high temperatures, in particular at temperatures >1,000° C.

12. A composite according to claim 11, in which the material for the first, carbon-containing layer contains up to 3% w/w of a flux.

13. A composite according to claim 1, in which the first, carbon-containing layer consists of >50% w/w of oxide refractory materials, and the second, carbonless layer consists of >80% w/w oxide, refractory materials.

14. A composite according to claim 1, fabricated as a distribution sleeve, shadow pipe, tapping sleeve of a melting vessel or submerged nozzle, in which the first carbon-containing layer again is outside, and the second, carbonless layer isinside.

15. A composite according to claim 1, fabricated as a monoblock stopper or a monoblock stopper cap, in which the first, carbon-containing layer runs inside, and the second, carbonless layer runs outside.

16. composite according to claim 1, in which a first outside and second inside layer are adjusted in such a way that the first, carbon-containing layer expands during inductive heating, and the second layer warmed by this first layer as the result of head conduction from the first layer expands into the expanded first layer.

* * * * *